(12) United States Patent
Hasegawa et al.

(10) Patent No.: US 8,714,294 B2
(45) Date of Patent: May 6, 2014

(54) PEDESTRIAN PROTECTION APPARATUS FOR VEHICLE

(75) Inventors: Kuniaki Hasegawa, Kariya (JP);
Keisuke Noyori, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 0 days.

(21) Appl. No.: 13/449,418

(22) Filed: Apr. 18, 2012

(65) Prior Publication Data

US 2013/0015011 A1 Jan. 17, 2013

(30) Foreign Application Priority Data

Jul. 11, 2011 (JP) ................................. 2011-153062

(51) Int. Cl.
*B60R 19/18* (2006.01)
*B60R 21/34* (2011.01)

(52) U.S. Cl.
USPC ........................ 180/274; 293/132; 296/187.04

(58) Field of Classification Search
USPC ................... 180/274; 280/751; 293/132, 133; 296/187.04
IPC ...................................................... B60R 21/34
See application file for complete search history.

(56) References Cited

U.S. PATENT DOCUMENTS

| | | | | |
|---|---|---|---|---|
| 3,930,665 | A * | 1/1976 | Ikawa | 280/751 |
| 3,997,207 | A * | 12/1976 | Norlin | 293/110 |
| 4,165,113 | A * | 8/1979 | Casse | 293/121 |
| 6,270,131 | B1 * | 8/2001 | Martinez et al. | 293/132 |
| 6,443,511 | B2 * | 9/2002 | Braun | 293/120 |
| 6,663,150 | B1 * | 12/2003 | Evans | 293/120 |
| 6,746,061 | B1 | 6/2004 | Evans | |
| 7,159,911 | B2 * | 1/2007 | Nguyen et al. | 293/102 |
| 7,204,545 | B2 * | 4/2007 | Roux et al. | 296/187.09 |
| 7,287,809 | B2 * | 10/2007 | Andre | 296/187.09 |
| 7,370,893 | B2 * | 5/2008 | Tamada et al. | 293/120 |
| 7,441,828 | B2 * | 10/2008 | Noyori et al. | 296/187.04 |
| 7,481,484 | B2 * | 1/2009 | Hirano | 296/187.04 |
| 7,516,994 | B2 * | 4/2009 | Ito | 293/133 |

(Continued)

FOREIGN PATENT DOCUMENTS

DE 10 2007 019 481 A1 11/2008
EP 1 826 069 A2 8/2007

(Continued)

OTHER PUBLICATIONS

Extended European Search Report dated Oct. 17, 2012.

*Primary Examiner* — Ruth Ilan
*Assistant Examiner* — Laura Freedman
(74) *Attorney, Agent, or Firm* — Burr & Brown, PLLC

(57) ABSTRACT

A pedestrian protection apparatus for a vehicle is provided that can sufficiently protect a pedestrian and can advantageously improve aerodynamic performance at a lower region of the vehicle. The apparatus includes a reinforcing portion at a front section thereof. The reinforcing portion includes a plurality of cylindrical structures that extend in a front to back direction of the vehicle and are arranged in a line in a vehicle width direction. The cylindrical structures include: vertical ribs that are opposed to each other in the vehicle width direction and extend in the front to back direction of the vehicle; an upper connecting plate that extends across upper ends of all of the vertical ribs so as to integrally connect the upper ends; and a lower connecting plate that extends across lower ends of all of the vertical ribs so as to integrally connect the lower ends.

11 Claims, 11 Drawing Sheets

(56) References Cited

U.S. PATENT DOCUMENTS

| | | | |
|---|---|---|---|
| 7,533,927 B2 * | 5/2009 | Ito et al. | 296/187.03 |
| 7,575,271 B2 * | 8/2009 | Hasegawa et al. | 296/187.04 |
| 7,597,383 B2 * | 10/2009 | Itou et al. | 296/187.04 |
| 7,607,720 B2 * | 10/2009 | Noyori et al. | 296/187.04 |
| 7,699,383 B2 * | 4/2010 | Fukukawa et al. | 296/187.04 |
| 7,887,121 B2 * | 2/2011 | Hasegawa et al. | 296/187.04 |
| 7,891,715 B2 * | 2/2011 | Noyori et al. | 293/121 |
| 8,042,847 B2 * | 10/2011 | Garg et al. | 293/102 |
| 8,118,346 B2 * | 2/2012 | Ginja et al. | 296/187.03 |
| 8,336,933 B2 * | 12/2012 | Nagwanshi et al. | 293/132 |
| 2007/0046043 A1 | 3/2007 | Ito | |
| 2007/0138815 A1* | 6/2007 | Fukukawa et al. | 293/15 |
| 2007/0200374 A1 | 8/2007 | Troton et al. | |

FOREIGN PATENT DOCUMENTS

| | | | | |
|---|---|---|---|---|
| EP | 1 867 525 A2 | 12/2007 | | |
| FR | 2 927 864 A1 | 8/2009 | | |
| JP | 2001071837 A | * 3/2001 | | B60R 19/18 |
| JP | 2006021601 A | * 1/2006 | | |
| JP | 2006111249 A | * 4/2006 | | |
| JP | 2007-055543 A1 | 3/2007 | | |
| JP | 2007331511 A | * 12/2007 | | |
| JP | 2007331512 A | * 12/2007 | | |
| JP | 2008074320 A | * 4/2008 | | |
| JP | 2010111322 A | * 5/2010 | | |
| JP | 2010-179671 A1 | 8/2010 | | |

* cited by examiner

PEDESTRIAN PROTECTION APPARATUS FOR VEHICLE

The present application is based on Japanese Patent Application No. 2011-153062 filed on Jul. 11, 2011, the contents of which are incorporated herein by reference.

BACKGROUND OF THE INVENTION

1. Field of the Invention

The present invention relates to a pedestrian protection apparatus for a vehicle, and in particular to an improved structure of the pedestrian protection apparatus disposed at a lower region of a front of the vehicle and arranged to apply a counterforce to a leg portion of a pedestrian by contact with the leg portion of the pedestrian that has collided or contacted with a front face of the vehicle, thereby protecting the leg portion of the pedestrian.

2. Description of the Related Art

In vehicles such as automobiles, there are conventionally disposed, at a front face, a rear face, or side faces, of the vehicles, various types of protection apparatus which absorb an impact energy generated upon a collision, for thereby protecting the vehicle body and vehicle passengers. In recent years, there is also disposed, at the front face of the vehicle, an apparatus for protecting a pedestrian upon collision (contact) of the pedestrian with the front face of the vehicle.

As one type of the pedestrian protection apparatus for a vehicle (hereinafter, simply referred to as the pedestrian protection apparatus), there is known a leg-sweep apparatus. Generally, the leg-sweep apparatus is disposed at a lower region of the front of the vehicle such as an inside of a front bumper and a portion below the front bumper. The apparatus is arranged to contact with a leg portion of the pedestrian upon collision of the pedestrian with the front face of the vehicle, whereby the leg portion of the pedestrian is swept or scooped to cause the pedestrian to be thrown toward a member such as a hood (bonnet) that can absorb the impact. Thus, the protection and safety of the pedestrian can be assured.

The pedestrian protection apparatus is expected to have a structure that can reduce the damage to the leg portion of the pedestrian that has collided with a front portion of the pedestrian protection apparatus. In order to satisfy this expectation, for example, JP-A-2007-55543 and JP-A-2010-179671 each disclose a pedestrian protection apparatus that is a resin molded product disposed at a lower region of a front of the vehicle so as to extend in a front to back direction of the vehicle. The resin product integrally includes a front section that includes a reinforcing portion and a rear section that is fixed to a vehicle component.

The pedestrian protection apparatus disclosed in JP-A-2007-55543 includes a resin plate member which is disposed at a lower region of a front of the vehicle so as to extend in a front to back direction of the vehicle. At the rear section of the plate member, it is bolted to a vehicle component. At the front section of the plate member, planar vertical ribs are integrally provided at a plurality of positions on one surface thereof with a predetermined distance therebetween in a vehicle width direction such that the planar vertical ribs extend in the front to back direction of the vehicle while being opposed to each other in the vehicle width direction. Further, between the vertical ribs on the front section of the plate member, planar horizontal ribs extending in the vehicle width direction are integrally provided so as to connect the opposing vertical ribs. Accordingly, the pedestrian protection apparatus includes, at the front section of the plate member, a rib structure having the vertical ribs and the horizontal ribs in combination. Further, the rib structure provides a reinforcing portion at the front section of the pedestrian protection apparatus. The reinforcing portion improves the strength of the front section, i.e., improves the deformation strength against the load input from the front side of the vehicle to the rear side.

The pedestrian protection apparatus disclosed in JP-A-2010-179671 includes upper reinforcing beads and lower reinforcing beads that are each alternately arranged at a front section of a resin plate member. The upper reinforcing beads each protrude upward with an angular U-shaped cross section and extend in the front to back direction of the vehicle while opening downward. The lower reinforcing beads each protrude downward with an angular U-shaped cross section and extend in the front to back direction of the vehicle while opening upward. Further, inside each of the upper and lower reinforcing ribs, a connection rib extending in the vehicle width direction is integrally provided between opposing vertical walls (vertical ribs) so as to connect the vertical walls. In other words, in this pedestrian protection apparatus, the reinforcing portion is provided at the front section thereof by the upper and lower reinforcing beads and the connecting ribs that are provided at the front section of the plate member. Accordingly, the rigidity of the front section (the deformation strength against the load input from the front side of the vehicle to the rear side) of the pedestrian protection apparatus is improved.

As described above, in the conventional pedestrian protection apparatus, the reinforcing portion is provided at the front section to improve the rigidity of the front section. As a result, a load-displacement curve showing the relationship between the impact load generated upon the contact of the leg portion of the pedestrian and the deformation (displacement) amount of the pedestrian protection apparatus has an almost ideal rectangular wave shape. Thus, the impact generated upon the contact of the leg portion of the pedestrian is efficiently and sufficiently absorbed, thereby effectively reducing the damage of the leg portion of the pedestrian.

However, various studies conducted by the present inventors revealed that the structure of the above-described conventional pedestrian protection apparatus has the following problem.

Generally, the pedestrian protection apparatus that is disposed at a lower region of a front of the vehicle receives the air at the upper and lower surfaces thereof during driving of the vehicle. Thus, it is preferable that the pedestrian protection apparatus have a structure that cannot only protect the pedestrian, but also can guide the airflow smoothly to the rear side. Such a structure improves aerodynamic performance of the vehicle, leading to an improvement of fuel efficiency.

However, in the conventional pedestrian protection apparatus, the reinforcing portion provided at the front section includes the planar horizontal ribs or the connecting ribs that extend in the vehicle width direction at the upper or lower surface of the front section. Thus, in the case where the conventional pedestrian protection apparatus is provided at the lower region of the front of the vehicle, during driving of the vehicle, the air contact with the horizontal ribs or the connection ribs so that the airflow is prevented by the horizontal ribs and the connecting ribs. In other words, in the conventional pedestrian protection apparatus, the horizontal ribs and the connection ribs function as aerodynamic drag (air resistance), which make it difficult to guide the airflow to the rear side. Thus, the conventional pedestrian protection apparatus can surely protect the pedestrian by being provided at the lower region of the vehicle, but may deteriorate the aerodynamic performance at the lower region of the vehicle.

SUMMARY OF THE INVENTION

The present invention was made in the light of the above-described situations. It is therefore an object of the present invention to provide an improved structure of a pedestrian protection apparatus that is not only capable of sufficiently and surely protecting a pedestrian, but also capable of effectively improving the aerodynamic performance at the lower region of the vehicle by reducing aerodynamic drag to the maximum extent possible.

The object of the present invention may be attained according to a first aspect of the present invention which provides a pedestrian protection apparatus for a vehicle, including: a resin molded product which is disposed at a lower region of a front of the vehicle so as to extend in a front to back direction of the vehicle, the resin molded product including a front section at which a reinforcing portion is provided and a rear section at which the apparatus is fixed to a vehicle component, the apparatus being arranged to protect a leg portion of a pedestrian that has collided with a front face of the vehicle by contact of a front end of the resin molded product with the leg portion of the pedestrian, wherein the reinforcing portion is constituted by a plurality of cylindrical structures that are arranged at the front section so as to be in a line in the vehicle width direction and extend in the front to back direction of the vehicle, the plurality of cylindrical structures including: (a) at least three vertical ribs that are arranged at the front section so as to oppose to each other in the vehicle width direction with a predetermined distance therebetween and extend in the front to back direction of the vehicle; (b) an upper connecting plate that is arranged to extend in the front to back direction of the vehicle while extending across upper ends of all of the at least three vertical ribs, thereby integrally connecting the upper ends of the at least three vertical ribs; and (c) a lower connecting plate that is arranged to extend in the front to back direction of the vehicle while extending across lower ends of all of the at least three vertical ribs, thereby integrally connecting the lower ends of the at least three vertical ribs.

According to a second aspect of the invention, each of the plurality of cylindrical structures has a rectangular vertical cross section.

According to a third aspect of the invention, the apparatus further including a front wall integrally and vertically provided at a front end of an upper surface of the lower connecting plate and extending over an entire width of the lower connecting plate, thereby closing a front of each of the plurality of cylindrical structures.

According to a fourth aspect of the invention, the at least three vertical ribs are arranged over an entire width of the front section at a regular interval.

According to a fifth aspect of the invention, each of at least some of the plurality of cylindrical structures has a rectangular vertical cross section and each of the remaining cylindrical structures has an octagonal vertical cross section, the plurality of cylindrical structures that have a rectangular vertical cross section and the plurality of cylindrical structures have an octagonal vertical cross section being alternately arranged.

According to a sixth aspect of the invention, the rear section and the lower connecting plate are constituted by a single member that extends in the front to back direction of the vehicle, and an upper surface of the upper connecting plate is made as an air guiding surface that guides airflow to a rear side of the vehicle, the air guiding surface extending in the front to back direction of the vehicle from a front end of each of the at least three vertical ribs to a position substantially directly above a position where the rear section is fixed to the vehicle component.

According to a seventh aspect of the invention, the upper connecting plate extends longer than the at least three vertical ribs in the front to back direction.

According to an eighth aspect of the invention, the at least three vertical ribs extend in the front to back direction of the vehicle from the front end of the lower connecting plate to a position near the position where the rear section is fixed to the vehicle component.

According to a ninth aspect of the invention, wherein at least one part of the upper connecting plate is made as a bending portion having an angular U-shaped cross section, the at least one part of the upper connecting plate being positioned between the upper ends of opposing two of the at least three vertical ribs.

According to a tenth aspect of the invention, wherein at least one part of the lower connecting plate is each made as a bending portion having an angular U-shaped cross section, the at least one part of the lower connecting plate being positioned between the lower ends of opposing two of the at least three vertical ribs.

According to an eleventh aspect of the invention, wherein at least one part of the upper connecting plate and at least one part of the lower connecting plate are each made as a bending portion having an angular U-shaped cross section, the at least one part of the upper connecting plate being positioned between the upper ends of opposing two of the at least three vertical ribs and at least one part of the lower connecting plate being positioned between the lower ends of opposing two of the at least three vertical ribs.

According to a twelfth aspect of the invention, wherein at least one of the upper connecting plate and the lower connecting plate includes an abutting portion that is positioned in front of the vehicle component in a state where the rear section of the resin molded product is fixed to the vehicle component, the abutting portion allowed to be in contact with the vehicle component at the time when the at least one of the upper connecting plate and the lower connecting plate having the abutting portion is displaced to the rear side upon collision of the pedestrian with the front section.

In the pedestrian protection apparatus for a vehicle according to the present invention, there is provided at a front section thereof a reinforcing portion constituted by a plurality of cylindrical structures that extend in the front to back direction. As a result, at the front section, the deformation strength against the load from the front side to the rear side of the vehicle is sufficiently improved.

Further, the vertical ribs and the upper and lower connecting plates, which constitute the reinforcing portion, are arranged so as to extend in the front to back direction of the vehicle. In addition, the vertical ribs are opposed to each other in the vehicle width direction and the upper connecting plate and the lower connecting plate are opposed to each other in the vertical direction. Due to this arrangement, unlike the conventional apparatus that includes the horizontal ribs and the connecting ribs that extend in the vehicle width direction with the surfaces thereof facing in the front to back direction, the pedestrian protection apparatus of the present invention does not include any members or portions that contact and block an airflow at the front section including the reinforcing portion. Thus, the aerodynamic drag of the front section is sufficiently made small and smooth airflow to the rear side can be stably secured.

Due to installation of the pedestrian protection apparatus of the present invention at the lower region of the front of the vehicle, pedestrians can sufficiently and surely be protected, and the lower region of the vehicle can have improved aerodynamic performance, compared with the conventional apparatus.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

To further clarify the present invention, there will be described in detail embodiments of the invention with reference to the drawings.

Figure 1:
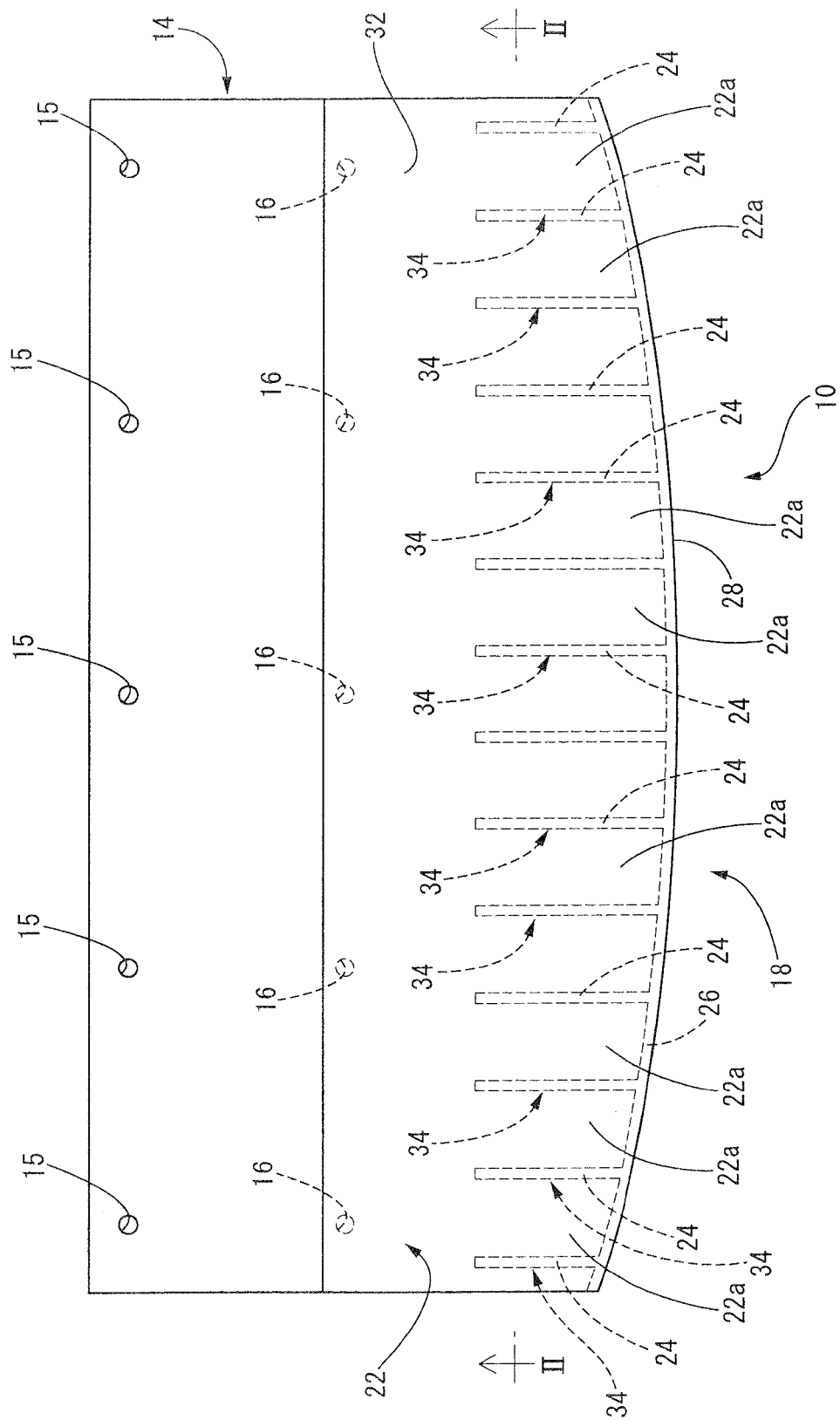
FIG. 1 is an explanatory top plan view showing a first embodiment of a pedestrian protection apparatus for a vehicle having a structure according to the present invention.
Figure 2:
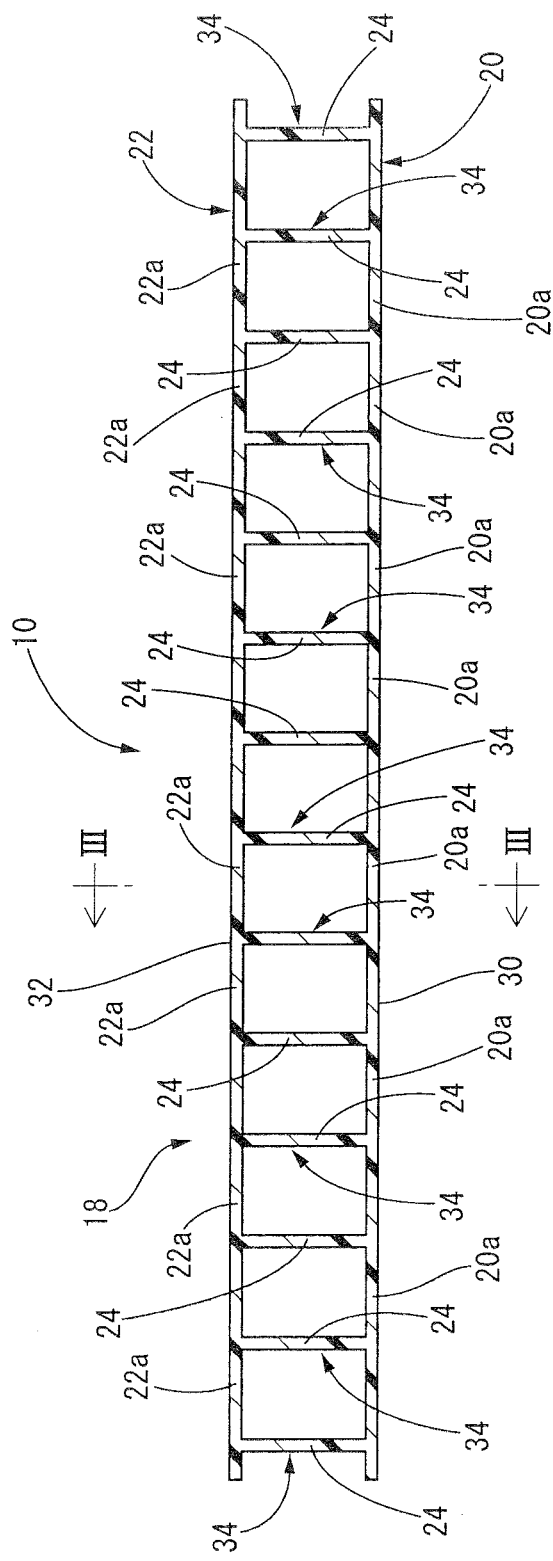
FIG. 2 is a cross sectional view taken along line II-II in FIG. 1.

FIG. 1 is a top plan view showing a first embodiment of the pedestrian protection apparatus according to the present invention, which is to be installed inside a front bumper provided at a front face of an automobile. The leg-sweep apparatus 10 of the first embodiment is a resin-molded product having an elongated-rectangular shape as a whole. The leg-sweep apparatus 10 is produced by an injection molding using a synthetic resin material such as polypropylene or ABS resin, for example. Hereinafter, under the installation of the leg-sweep apparatus 10 inside the front bumper (12) of the automobile (see FIG. 4), a thickness (height) direction of the leg-sweep apparatus 10, i.e., the direction perpendicular to the plane of the sheet of FIG. 1, is referred to as a vertical direction, a longitudinal direction of the leg-sweep apparatus 10, i.e., a right-to-left direction in FIG. 1 is referred to as a vehicle width direction or horizontal direction, and a direction perpendicular to both of the longitudinal direction and the thickness direction of the leg-sweep apparatus 10, i.e., an up-and-down direction in FIG. 1 is referred to as a front to back direction.

Figure 3:
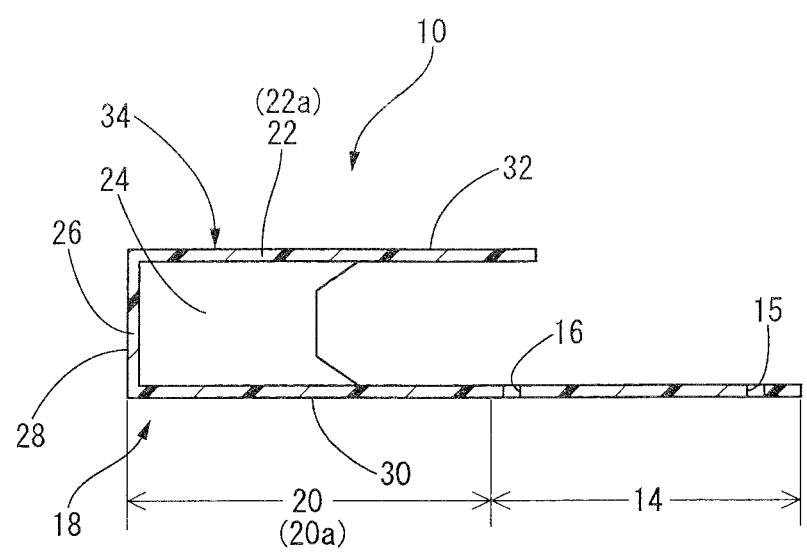
FIG. 3 is a cross sectional view taken along line III-III in FIG. 2.

With reference to FIG. 1 and FIG. 3, a rear section of the leg-sweep apparatus 10 which occupies a substantially rear half region of the leg-sweep apparatus 10 is made as an attachment plate 14. The attachment plate 14 is an elongated-rectangular flat plate having a uniform thickness. At rear and front end portions of the attachment plate 14, a plurality of rear through holes 15 (here five) and a plurality of front through holes 16 (here five) into each of which a fixing bolt is insertable are respectively provided such that the holes are spaced apart from each other by a suitable distance in the vehicle width direction.

The other section of the leg-sweep apparatus 10 than the rear section, i.e., a front section of the leg-sweep apparatus 10, is made as a reinforcing portion 18. In the present embodiment, the reinforcing portion 18 has a unique structure that cannot be seen in the conventional leg-sweep apparatus.

The reinforcing portion 18 integrally includes a lower connecting plate 20, an upper connecting plate 22, and a plurality of vertical ribs 24 (here fourteen). The upper connecting plate 22 is positioned above the lower connecting plate 20 so as to be opposed to each other with a predetermined distance therebetween. The vertical ribs 24 are vertically provided between the upper connecting plate 22 and the lower connecting plate 20.

More specifically described, the lower connecting plate 20 is an elongated-rectangular flat plate integrally extending frontward from the front end of the attachment plate 14. A thickness and a dimension measured in the horizontal direction (dimension in the vehicle width direction) of the lower connecting plate 20 are substantially the same as those of the attachment plate 14. That is, here, the lower connecting plate 20 and the attachment plate 14 are made of a single plate. A shape of a front face of the lower connecting plate 20 is a curved convex shape protruding frontward and corresponding to an inner surface of the front bumper 12.

At a front end of an upper surface of the lower connecting plate 20, a front wall 26 is integrally and vertically provided. The front wall 26 is made of a curved plate member that extends upwards with a predetermined height and continuously extends along the front end of the lower connecting plate 20 in the horizontal direction over the entire width of the lower connecting plate 20. The front wall 26 has substantially the same thickness as the lower connecting plate 20. A front face of the front wall 26 and the front face of the lower connecting plate 20 provide an impact input surface 28 that has a curved convex shape protruding frontward and corresponding to the inner surface of the front bumper 12.

Each of the vertical ribs 24 is made of a rectangular flat plate having the same thickness as the attachment plate 14 and the lower connecting plate 20, a smaller dimension in the front to back direction than the lower connecting plate 20, and the same height as the front wall 26. The vertical ribs 24 are integrally provided on the upper surface of the front section of the lower connecting plate 20 such that the vertical ribs 24 are opposed to each other with a predetermined distance therebetween in the horizontal direction and extend straight rearwardly from the front end of the lower connecting plate 20.

In other words, the lower connecting plate 20 is arranged so as to extend across lower ends of all of the vertical ribs 24. The lower ends of the vertical ribs 24 are connected via the front section of the lower connecting plate 20. That is, a pair of vertical ribs 24, 24 that are opposed in the horizontal direction is connected via a part of the lower connecting plate 20, which is hereinafter referred to as a lower connecting plate part 20a, that extends horizontally between the lower ends of the vertical ribs 24. The lower surface of the lower connecting plate 20 that connects the lower ends of the vertical ribs 24 is made as a lower air guiding surface 30 that is a flat surface extending horizontally.

The vertical ribs 24 are integrated on a back surface of the front wall 24 at front ends thereof. The vertical ribs 24 extend straight in the front to back direction from the back surface of the front wall 26 to the middle in the front to back direction of the lower connecting plate 20 while being vertically provided on the upper surface of the lower connecting plate 20.

Similarly to the lower connecting plate 20, the upper connecting plate 22 is an elongated-rectangular flat plate, and a front face of the upper connecting plate 22 has a curved convex shape protruding frontward and corresponding to the inner surface of the front bumper 12. The upper connecting plate 22 has substantially the same thickness and the same dimension measured in the horizontal direction as the lower connecting plate 20 and the larger dimension measured in the front to back direction than the lower connecting plate 22 by a predetermined dimension. Specifically, the dimension of the upper connecting plate 22 in the front to back direction is the same as the dimension of the lower connecting plate 20 measured from the front end of the lower connecting plate 20 to the position beyond the front through holes 16. In other words, the upper connecting plate 22 extends in the front to back direction from the front end of the vertical rib 24 to a position substantially directly above and beyond the front through holes 16 of the attachment plate 14.

The upper connecting plate 22 is positioned above the lower connecting plate 20 such that the front end thereof corresponds to the front end of the lower connecting plate 20 in the front to back direction. The lower surface of the front end side of the upper connecting plate 22 is integrated on the upper surface of each of the front wall 26 and the vertical ribs 24 provided on the lower connecting plate 20. Thus, the upper connecting plate 22 and the lower connecting plate 20 are connected via the vertical ribs 24 that extend in the front to back direction and the front wall 26 that extends in the horizontal direction.

The upper connecting plate 22 extends horizontally across upper ends of all of the vertical ribs 24. The upper ends of the vertical ribs 24 are connected via a front end section of the upper connecting plate 22. That is, a pair of vertical ribs 24, 24 that are opposed to each other in the horizontal direction is connected via a part of the upper connecting plate 22, which is hereinafter referred to as an upper connecting plate part 22a, that extends horizontally between the upper ends of the vertical ribs 24. The upper surface of the upper connecting plate 22 that connects the upper ends of the vertical ribs 24 is made as an upper air guiding surface 32 that is a flat surface extending horizontally.

The front wall 26 extends across all of the front ends of the vertical ribs 24, so that the front ends of the vertical ribs 24 are connected via the front wall 26. Further, the front end of the upper connecting plate 22 and the front end of the lower connecting plate 20 are connected via the front wall 26.

As a result, at the front section of the leg-sweep apparatus 10 of the present embodiment, cylindrical structures 34 extending in the front to back direction are provided. The cylindrical structures 34 each have a rectangular tubular shape including a pair of opposing vertical ribs 24 as right and left walls and the upper connecting plate part 22a and the lower connecting plate part 20a as upper and lower walls. The cylindrical structures 24 are arranged in a line in the horizontal direction. Two of the plurality of cylindrical structures 34 that are adjacent to each other in the horizontal direction share one of the vertical ribs 24 positioned between the adjacent cylindrical structures 34 as the right or left wall. The cylindrical structures 34 having such a structure provide the reinforcing portion 18.

At the front section of the leg-sweep apparatus 10, the cylindrical structures 34 extending in the front to back direction are arranged in a line in the horizontal direction. Adjacent ones of the cylindrical structures 34 are connected via the upper connecting plate part 22a and the lower connecting plate part 20a that extend across the vertical rib 24 that is the right wall of the cylindrical structure 34 on the left and the vertical rib 24 that is the left wall of the cylindrical structure 34 on the right.

In the leg-sweep apparatus 10 of the present embodiment, the vertical ribs 24 of the reinforcing portion 18 and the upper and lower connecting plate parts 22a, 20a connecting the vertical ribs 24 function as the vertical ribs and the horizontal ribs of the reinforcing portion of the conventional leg-sweep apparatus, which is constituted by a rib structure. Further, two adjacent vertical ribs 24 and the upper connecting plate part 22a connecting the two adjacent vertical ribs 24 form a member having an angular U-shaped cross section that functions as the reinforcing bead provided at the reinforcing portion of the conventional leg-sweep apparatus, and the lower connecting plate part 20a functions as the connecting rib that connects vertical walls (vertical ribs) of the reinforcing beads.

Accordingly, the reinforcing portion 18 of the leg-sweep apparatus 10 has substantially the same rigidity (deformation strength) against the impact load input in the front to back direction, which is the extending direction of the cylindrical structures 34, as the reinforcing portion of the conventional leg-sweep apparatus, which is constituted by a rib structure or the reinforcing portion including a plurality of reinforcing beads and connecting ribs.

Figure 4:
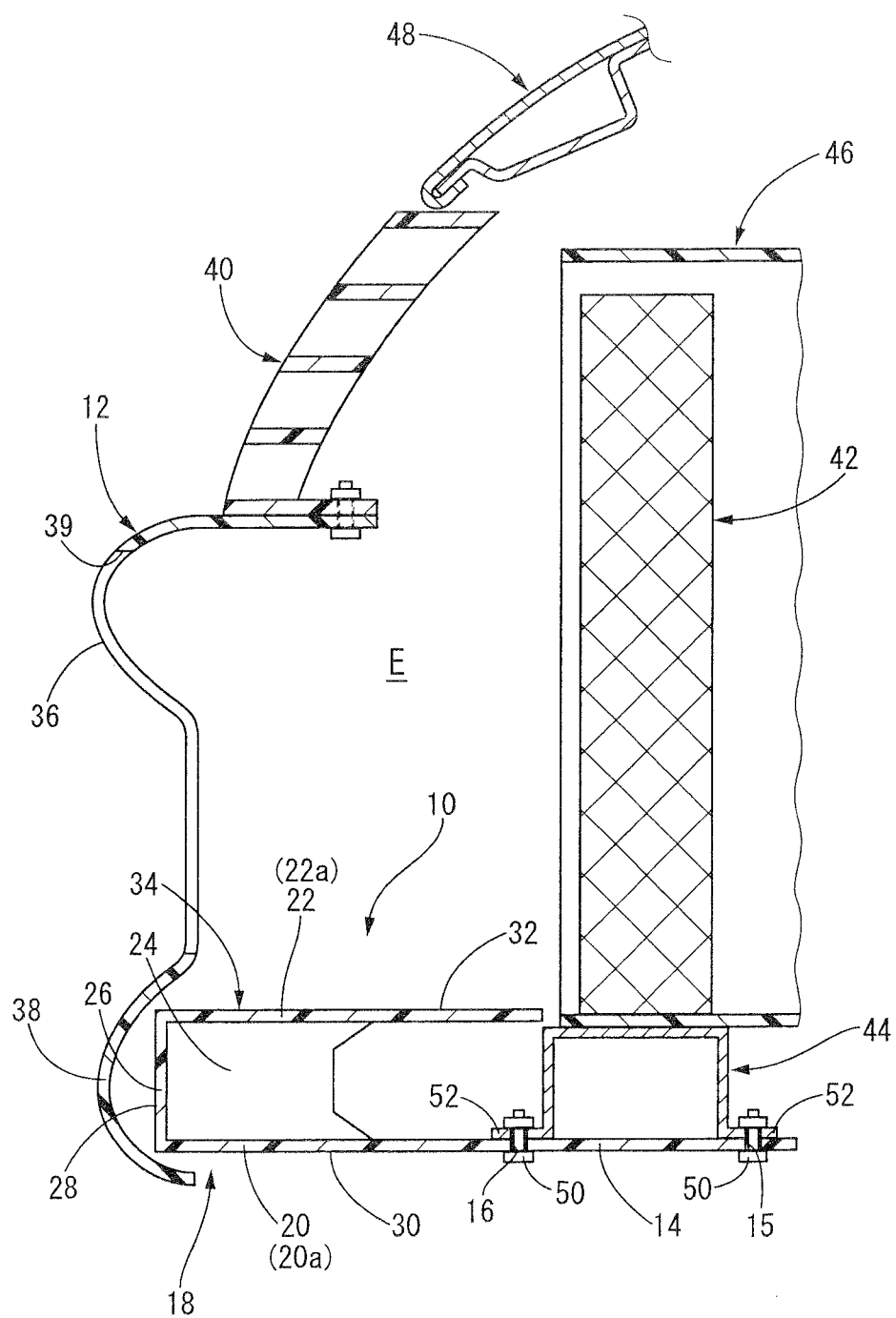
FIG. 4 is a vertical cross sectional view showing a state in which the pedestrian protection apparatus in FIG. 1 is installed on a vehicle.

As shown in FIG. 4, the leg-sweep apparatus 10 having the above-described structure is installed in an engine room E that is positioned in the front of the vehicle so as to be positioned at the back of the front bumper 12 provided at the front face of the vehicle.

The front bumper 12 has a curved shape that curves in the vehicle width direction as a whole, and includes an upper protrusion 36 and a lower protrusion 38 that protrude from the front face of the vehicle. The upper protrusion 36 and the lower protrusion 38 each have a vertical cross section that is a curved shape protruding frontward. At an upper position of the lower protrusion 38 of the front bumper 12, there is an air inlet 39 to take the airflow into the engine room E from the outside. The front bumper 12 is fixed to a front grill that is the front face of the vehicle, by a bolt, for example.

In the engine room E positioned at the back of the front bumper 12, there is a radiator 42. The radiator 42 is contained in a shroud having a frame-like or cylindrical shape and fixed on a radiator support 44 in the engine room E. In FIG. 4, the numeral reference 48 refers to a hood.

The leg-sweep apparatus 10 is provided between the front bumper 12 and the radiator support 44 at the lower region of the engine room E so as to extend in the front to back direction. Under installation of the leg-sweep apparatus 10, front ends of the cylindrical structures 34 constituting the reinforcing portion 18 is positioned inside the lower protrusion 38 of the front bumper 12 and the attachment plate 14 is positioned below the radiator support 44. The attachment plate 14 is fixed on flanges 52, 52, which are integrally provided at front and rear surfaces of the radiator support 44, by fixing bolts 50 inserted through the rear and front through holes 15, 16. As apparent from this, in the present embodiment, the positions where the front through holes 16 and the rear through holes 15 are provided are the positions where the attachment plate 14 is fixed to the automobile.

The leg-sweep apparatus 10 is provided between the lower protrusion 38 of the front bumper 12 and the radiator support 44 at the lower region of the automobile such that the cylindrical structures 34 extend in the front to back direction, i.e., the input direction of the impact load that is generated upon collision of the pedestrian with the front bumper 12. Under such a state, the impact input surface 28 of the front wall 26 of the reinforcing portion 18 is fixedly positioned inside the lower protrusion 38 of the front bumper 12 so as to be perpendicular to the input direction of the impact load.

Under installation of the leg-sweep apparatus 10 of the present embodiment in the front of the automobile, when a leg portion of the pedestrian comes into contact or collides with the front bumper 12, the counterforce against the impact load acts on the vicinity of the shank of the leg portion of the pedestrian from the impact input surface 28 of the front wall 26 of the reinforcing portion 18 via the front bumper 12. In this instance, since the reinforcing portion 18 constituting the front of the leg-sweep apparatus 10 is made of the cylindrical structures 34 extending in the input direction of the impact load, the rigidity (deformation strength) of the reinforcing portion 18 is sufficiently secured. As a result, the leg-sweep apparatus 10 is not easily deformed. Thus, the vicinity of the shank of the leg portion of the pedestrian who has contacted or collided with the front bumper 12 is swept or scooped up by the leg-sweep apparatus 10, thereby causing the pedestrian to fall down or to be thrown toward the hood 48 of the vehicle, for example. As a result, the protection and safety of the pedestrian can be effectively assured.

In the leg-sweep apparatus 10, the upper connecting plate 22 extends in the front to back direction from the front end of the vertical rib 24 to a position substantially directly above and beyond the front through holes 16 of the attachment plate 14. Therefore, under installation of the leg-sweep apparatus 10 in the front of the automobile, a rear end face of the upper connecting plate 22 of the reinforcing portion 18 is opposed to the front face of the shroud 46 or the radiator 42 on the radiator support 44 with a predetermined distance therebetween. Accordingly, the upper air guiding surface 32 constituted by the upper surface of the upper connecting plate 22 extends horizontally over substantially the entire area from the back surface (inner surface) of the front bumper 12 to the front face of the radiator 42 at the lower region of the engine room E. In addition, the lower air guiding surface 30 constituted by the lower surface of the lower connecting plate 20 extends horizontally at the outside of the engine room E.

As a result, under installation of the leg-sweep apparatus 10 in the front of the automobile, the leg-sweep apparatus 10 of the present embodiment can smoothly guide the air taken from the air inlet 39 of the front bumper 12 with the upper air guiding surface 32 to the front face of the radiator. In addition, the air passing under the front bumper 12 can be guided by the lower air guiding surface 30 to the rear side.

Thus, under installation of the leg-sweep apparatus 10 in the front of the automobile, the leg-sweep apparatus 10 of the present embodiment can sufficiently reduce aerodynamic drag at the lower region of the front of the automobile and aerodynamic performance of the lower region of the automobile is effectively improved, thereby advantageously improving the fuel efficiency.

The upper connecting plate 22 of the leg-sweep apparatus 10 has the dimension in the front to back direction that is larger than the dimension of the vertical rib 24 in the front to back direction. Further, the lower connecting plate 20 and the attachment plate 14 are made of a single plate member. Thus, spaces between the upper ends of the adjacent vertical ribs 24 and the lower ends of the adjacent vertical ribs 24 are closed by the upper connecting plate 22 and the lower connecting plate 20. Due to this arrangement, under installation of the leg-sweep apparatus 10 at the lower region of the front of the automobile, it can be advantageously prevented that the air taken into the engine room E from the air inlet 39 or the air flowing below the leg-sweep apparatus 10 is entered into the spaces between the adjacent vertical ribs 24 and disturbed or blocked. As a result, the aerodynamic performance at the lower region of the automobile is stably improved.

Although the front wall 26 extending in the horizontal direction is provided at the front end of the reinforcing portion 18, under installation of the leg-sweep apparatus 10 in the automobile, the front wall 26 is positioned inside the front bumper 12. Thus, the front wall 26 does not function as the aerodynamic drag against the flowing air.

FIG. 5 to FIG. 9 show a second embodiment of a pedestrian protection apparatus according to the present invention as a leg-sweep apparatus 54. The leg-sweep apparatus 54 of this embodiment shown in FIG. 5 to FIG. 9 has the same structure as the leg-sweep apparatus 10 of the first embodiment except for the reinforcing portion 18. In the detailed explanation of the leg-sweep apparatus 10 of this embodiment, the same reference numerals as used in FIG. 1 to FIG. 4 are used for members and portions having the same structures as those of the first embodiment, and a detailed explanation of which is dispensed with. The same apply to other embodiments shown in FIG. 10 to FIG. 16 which will be described later.

Figure 5:
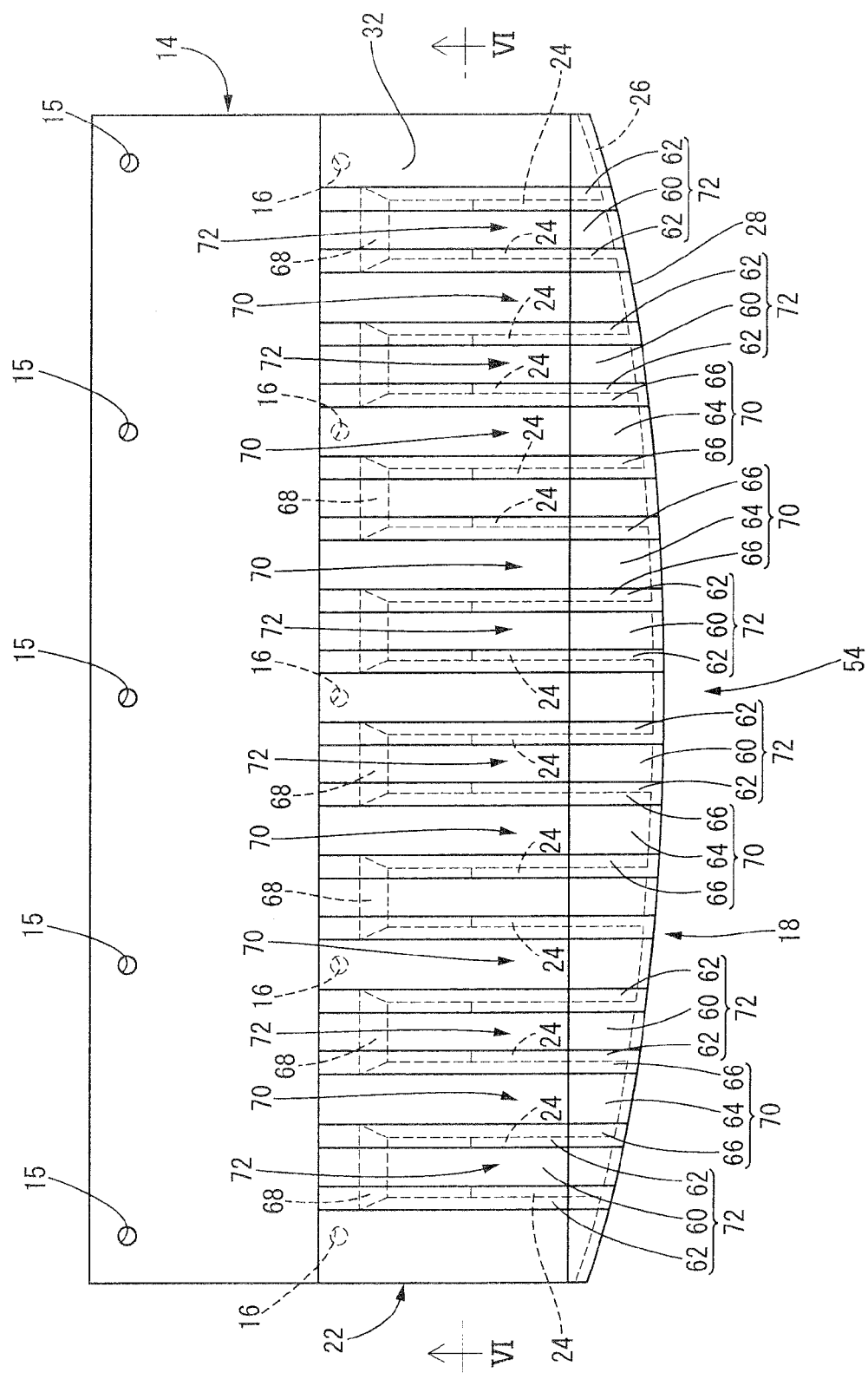
FIG. 5 is a view showing a second embodiment of a pedestrian protection apparatus for a vehicle having a structure according to the present invention, and corresponding to FIG. 1.
Figure 6:
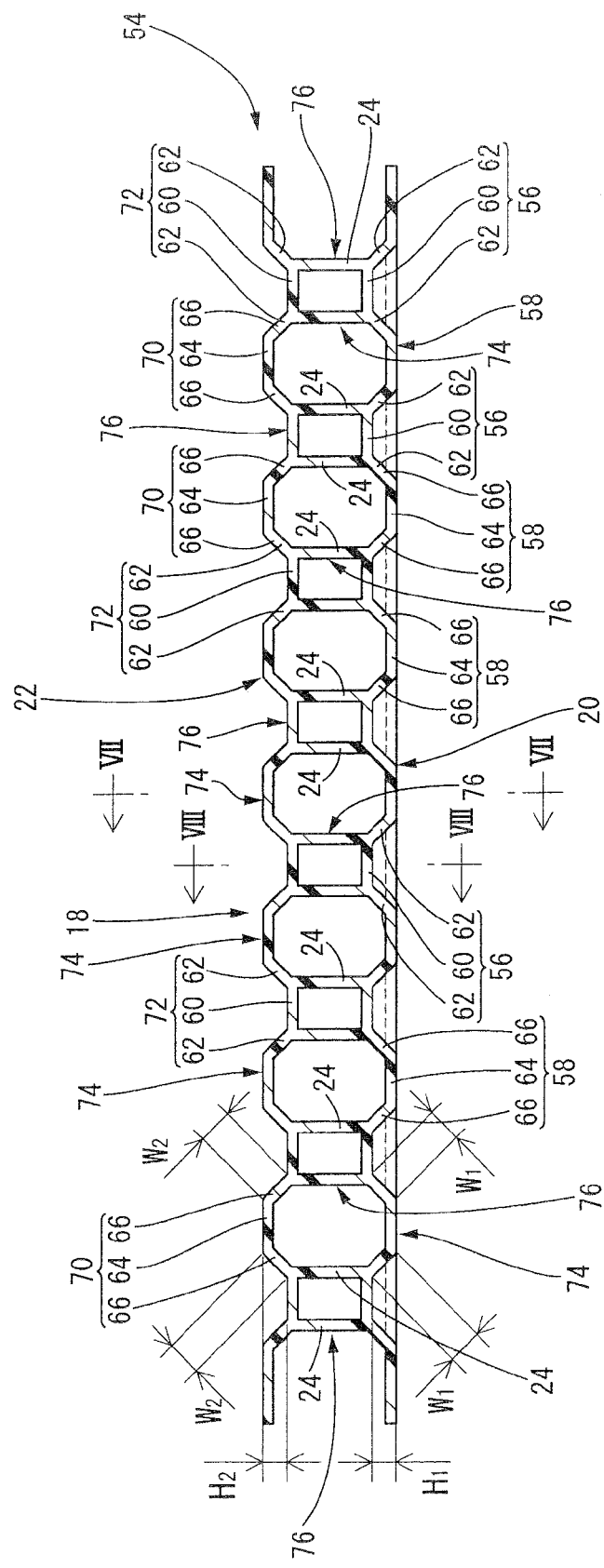
FIG. 6 is a cross sectional view taken along line VI-VI in FIG. 5.
Figure 7:
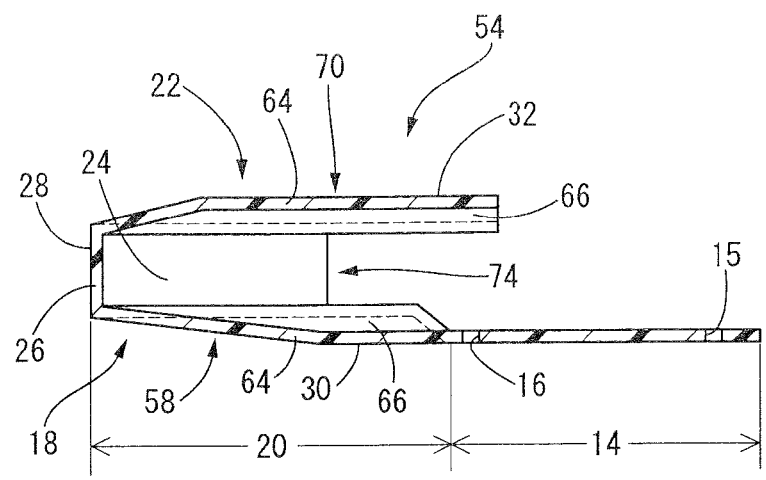
FIG. 7 is a cross sectional view taken along line VII-VII in FIG. 6.
Figure 8:
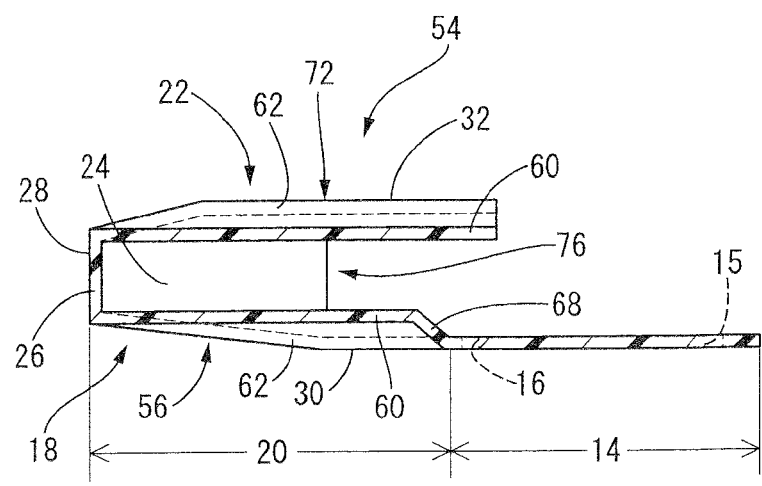
FIG. 8 is a cross sectional view taken along line VIII-VIII in FIG. 6.

With reference to FIG. 5, the leg-sweep apparatus 54 of this embodiment is formed of a resin-molded product having an elongated-rectangular shape as a whole. The rear section which occupies a substantially rear half region of the leg-sweep apparatus 54 is made as the attachment plate 14 and the other section of the leg-sweep apparatus 54 than the rear section, i.e., a front section of the leg-sweep apparatus 54 is made as the reinforcing portion 18.

With reference to FIG. 5 to FIG. 8, the reinforcing portion 18 integrally includes the upper connecting plate 22, the lower connecting plate 20, and a plurality of vertical ribs 24 (here sixteen) that are vertically provided between the upper connecting plate 22 and the lower connecting plate 20.

The lower connecting plate 20 integrally extends from the front end of the attachment plate 14 with substantially the same thickness and the same dimension measured in the horizontal direction (extending direction in the vehicle width direction) as the attachment plate 14. In this embodiment, the lower connecting plate 20 is made of a corrugated plate alternately including, in the horizontal direction, convex portions and concave portions each having a trapezoidal cross section.

In other words, the lower connecting plate 20 integrally includes a plurality of first reinforcing beads 56 (here eight) protruding upward and extending straight in the front to back direction and a plurality of second reinforcing beads 58 (here seven) protruding downward and extending straight in the front to back direction. The first and second reinforcing beads 56 and 58 are each alternately provided in the horizontal direction.

The first reinforcing bead 56 has an angular U-shaped cross section or a trapezoidal cross section having a longer lower base than an upper base, with the opening facing downward. The first reinforcing bead 56 includes a horizontal plate 60 that extends horizontally in the front to back direction and laterally inclined plates 62, 62 that extend obliquely downward to the left and right from each end of the horizontal plate 60 and extends continuously in the front to back direction along the horizontal plate 60. The second reinforcing bead 58 has an angular U-shaped cross section or a trapezoidal cross section having an upper base longer than a lower base, with the opening facing upward. The second reinforcing bead 58 includes a horizontal plate 64 that extends horizontally in the front to back direction and laterally inclined plates 66, 66 that extend obliquely upward to the left and right from each end of the horizontal plate 64 and extends continuously in the front to back direction along the horizontal plate 64.

Adjacent ones of the first reinforcing beads 56 and the second reinforcing beads 58 share the laterally inclined plate 62, 66 which is positioned therebetween. The horizontal plate 64 of the second reinforcing bead 58 integrally extends from the front end of the attachment plate 14, and a section from middle to front of the horizontal plate 64 inclines upward to the front. Further, at the rear end of the first reinforcing bead 56, a rearwardly inclined plate 68 is integrally provided so as to extend obliquely upward from the front end of the attachment plate 14. Thus, the first reinforcing bead 56 opens frontward and is closed at a rear thereof by the rearwardly inclined plate 68.

In the present embodiment, the height difference between the horizontal plate 60 of the first reinforcing bead 56 and the horizontal plate 64 of the second reinforcing bead 58 (the dimension indicated by $H_1$ in FIG. 6) is made sufficiently small and the width of the laterally inclined plate 62, 66 of each of the first and second reinforcing beads 56, 58 (the dimension indicated by $W_1$ in FIG. 6) is made small to the maximum extent possible.

It is to be understood that the height $H_1$ of the first and second reinforcing beads 56, 58 is not particularly limited. However, it is preferable that the first and second reinforcing beads 56, 58 have a height of 5 to 10 mm that is smaller than the half of the height of the upper and lower reinforcing beads of the conventional leg-sweep apparatus including a plurality of upper reinforcing beads and lower reinforcing beads.

Since the height $H_1$ of the first and second reinforcing beads 56, 58 and the width $W_1$ of the laterally inclined plate 62, 66 of each of the first and second reinforcing beads 56, 58 are made sufficiently small, it can be prevented to the maximum extent possible that upper end portions of the laterally inclined plates 62, 62 of the first reinforcing bead 56 are deformed to be spaced apart from each other when the impact load is inputted into the lower connecting plate 20 from the front side to the rear side. In addition, it can be prevented to the maximum extent possible that upper end portions of the laterally inclined plates 66, 66 of the second reinforcing bead 58 are deformed to be spaced apart from each other.

For ease of the understanding of the structure of the lower connecting plate 20, the lower connecting plate 20 will be described from a different angle. In the lower connecting plate 20, the first reinforcing beads 56 are integrally provided in a line with a predetermined distance therebetween in the horizontal direction. As described above, the first reinforcing bead 56 includes the horizontal plate 60, the laterally inclined plates 62, 62 that are integrally provided at each end in the horizontal direction of the horizontal plate 60, and the rearwardly inclined plate 68 that is integrally provided at the rear end of the horizontal plate 60 and the respective laterally inclined plates 62, 62 to connect them with the front end of the attachment plate 14. Adjacent ones of the plurality of first reinforcing beads 56 are connected at the laterally inclined plates 62, 62 via the horizontal plate 64 integrally extending from the front end of the attachment plate 14.

At the front end of the upper surface of the lower connecting plate 20, the front wall 26 is integrally vertically provided. The front wall 26 has the same structure as the front wall 26 of the leg-sweep apparatus 10 of the first embodiment, which is integrally provided at the lower connecting plate 20.

The vertical ribs 24 are each made of a rectangular plate having the same thickness as the attachment plate 14 and the lower connecting plate 20, the smaller dimension in the front to back direction than the lower connecting plate 20, and the same height as the front wall 26. The vertical ribs 24 are positioned at left and right ends of the first reinforcing bead 56 in the front section of the horizontal plate 60 so as to extend straight rearwardly to the middle in the front to back direction from the front end of the lower connecting plate 20 while being opposed to each other. The vertical ribs 24 are integrally provided on the lower connecting plate 20.

In other words, the lower connecting plate 20 is arranged so as to extend horizontally over all lower ends of the vertical ribs 24. Adjacent ones of the vertical ribs 24 are connected via the second reinforcing bead 58 or the horizontal plate 60 of the first reinforcing bead 56 at the lower ends thereof.

Further, in other words, the lower connecting plate 20 is integrally provided on the front end of the attachment plate 14 via the rearwardly inclined plate 68 that extends obliquely upward to the front. At the upper surface of the front section of the lower connecting plate 20, the vertical ribs 24 are integrally provided so as to extend in the front to back direction, with a predetermined distance therebetween in the horizontal direction. A portion of the lower connecting plate 20 positioned between the lower ends of the opposing vertical ribs 24 integrally includes the second reinforcing bead 58 having an angular U-shaped cross section opening upward.

In the present embodiment, like the first embodiment, the vertical ribs 24 are integrated with the back surface of the front wall 26. Further, the entire of the lower surface of the lower connecting plate 20 is made as the lower air guiding surface 30.

The upper connecting plate 22 is made of a corrugated plate having the same shape as the vertically flipped lower connecting plate 20. Specifically described, the lower connecting plate 22 also integrally includes a plurality of first reinforcing beads 70 (here, seven) that protrude upward and extend straight in the front to back direction and a plurality of second reinforcing beads 72 (here, eight) that protrude downward and extend straight in the front to back direction such that they are arranged alternately in the horizontal direction. The first reinforcing bead 70 of the upper connecting plate 22 has the same structure as the second reinforcing bead 58 of the lower connecting plate 20. That is, the first reinforcing bead 70 integrally includes the horizontal plate 64 and the laterally inclined plates 66, 66. Further, the second reinforcing bead 72 of the upper connecting plate 22 has the same structure as the first reinforcing bead 56 of the lower connecting plate 20 except that the rearwardly inclined plate 68 is eliminated. That is, the second reinforcing bead 72 integrally includes the horizontal plate 60 and the laterally inclined plates 62, 62.

Here, the entire of the upper surface of the upper connecting plate 22 is also made as the upper air guiding surface 32. The first and second reinforcing beads 70, 72 of the upper connecting plate 22 each has a height (the dimension indicated by $H_2$ in FIG. 6) that is substantially the same as the height of the first and second reinforcing beads 56, 58 of the lower connecting plate 22 (the dimension indicated by $H_1$ in FIG. 6). As a result, the width of the laterally inclined plate 66, 62 of each of the first and second reinforcing beads 70, 72 (the dimension indicated by $W_2$ in FIG. 6) is made small to the maximum extent possible.

The upper connecting plate 22 is positioned above the lower connecting plate 20 such that the front end thereof corresponds to the front end of the lower connecting plate 20 in the front to back direction. The upper connecting plate 22 is integrated with the upper surface of each of the vertical ribs 24 at the lower end of the laterally inclined plates 66, 66 of each of the first reinforcing beads 70. Further, the front end of the lower surface of the upper connecting plate 22 is integrated with the upper end surface of the front wall 26 that is vertically provided on the lower connecting plate 20. Thus, the upper connecting plate 22 and the lower connecting plate 20 are connected via the vertical ribs 24 extending in the front to back direction and the front wall 26 extending in the horizontal direction.

In other words, the upper connecting plate 20 is arranged so as to extend horizontally over all upper ends of the vertical ribs 24. Adjacent ones of the vertical ribs 24 are connected via the first reinforcing bead 70 or the horizontal plate 60 of the second reinforcing bead 72 at the upper ends thereof.

Further, in other words, at the lower surface of the front section of the upper connecting plate 22, the vertical ribs 24 are integrally provided so as to extend in the front to back direction with a predetermined distance in the vehicle width direction. A portion of the upper connecting plate 22 positioned between the upper ends of the opposing vertical ribs 24 includes the first reinforcing bead 70 having an angular U-shaped cross section opening downward.

Accordingly, at the front section of the leg-sweep apparatus 54 of the present embodiment, a plurality of first cylindrical structures 74 (here, seven) each having an octagonal vertical cross section and a plurality of second cylindrical structures 76 (here, eight) each having a rectangular vertical cross section are each alternately provided in the horizontal direction.

The first cylindrical structure 74 has an octagonal tubular shape that extends in the front to back direction. The first cylindrical structure 74 includes, as walls of the octagonal tube, the horizontal plate 64 and the laterally inclined plates 66, 66 of the first reinforcing bead 70 of the upper connecting plate 22, the horizontal plate 64 and the laterally inclined plates 66, 66 of the second reinforcing bead 58 of the lower connecting plate 20, and two of the vertical ribs 24, 24. The second cylindrical structure 76 has a rectangular tubular shape that extends in the front to back direction. The second cylindrical structure 76 includes, as walls of the rectangular tube, the horizontal plates 60, 60 of the second reinforcing bead 72 of the upper connecting plate 22 and the first reinforcing bead 56 of the lower connecting plate 20 and two of the vertical ribs 24, 24. The reinforcing rib 18 is constituted by the first cylindrical structures 74 and the second cylindrical structures 76. Adjacent ones of the first cylindrical structure 74 and the second cylindrical structure 76 share the vertical rib 24 positioned therebetween as a right or left wall.

In the leg-sweep apparatus 54 of the present embodiment, the vertical ribs 24 and the horizontal plates 60, 64, 64, 60 of the first and second reinforcing beads 56, 58, 70, 72 of the upper and lower connecting plates 22, 20 that connect the vertical ribs 24 function, respectively, as the vertical ribs and the horizontal ribs of the reinforcing portion constituted by the rib structure of the conventional leg-sweep apparatus. Further, the portion having an angular U-shaped cross section that includes two of the adjacent vertical ribs 24, 24 and the first reinforcing bead 70 of the upper connecting plate 22, which connects upper ends of the vertical ribs 24, 24, and the portion having an angular U-shaped cross section that includes two of the adjacent vertical ribs 24, 24 and the horizontal plate 60 of the second reinforcing bead 72 of the upper connecting plate 22, which connects upper ends of the vertical ribs 24, 24, function as the upper reinforcing bead in the reinforcing portion of the conventional leg-sweep apparatus. Further, the horizontal plate 64 of the second reinforcing bead 58 of the lower connecting plate 20 and the horizontal plate 60 of the first reinforcing bead 56 function as the connection rib connecting the vertical walls (vertical ribs) of the upper reinforcing bead provided in the reinforcing portion of the conventional apparatus. Further, the portion having an angular U-shaped cross section that includes two of the adjacent vertical ribs 24, 24 and the second reinforcing bead 58 of the lower connecting plate 20, which connects lower ends of the vertical ribs 24, 24, and the portion having an angular U-shaped cross section that includes two of the adjacent vertical ribs 24, 24 and the first reinforcing bead 56 of the lower connecting plate 20, which connects lower ends of the vertical ribs 24, 24 function as the lower reinforcing bead provided in the reinforcing portion of the conventional apparatus. Further, the horizontal plate 64 of the first reinforcing bead 70 and the horizontal plate 60 of the second reinforcing bead 72 of the upper connecting plate 22 function as the connecting rib that connect vertical walls (vertical rib) of the lower reinforcing bead in the reinforcing portion of the conventional apparatus.

Further, in the leg-sweep apparatus 54, the portion having an angular U-shaped cross section that is provided in the reinforcing portion of the conventional leg-sweep apparatus and functions as the upper reinforcing bead or the lower reinforcing bead, or the portion that functions as the connecting rib that connects the vertical walls of the first and second reinforcing beads, includes the first reinforcing beads 56, 70 and the second reinforcing beads 58, 72 each having an angular U-shaped cross section or a trapezoidal shape cross section.

Accordingly, the leg-sweep apparatus 54 of the present embodiment has substantially the same or better rigidity against the impact load inputted into the front to back direction, compared with the reinforcing portion constituted by the rib structure and the reinforcing portion including the reinforcing beads and the connecting ribs of the conventional leg-sweep apparatus.

The leg-sweep apparatus 54 having the above-described structure is disposed at a lower region of the front of the automobile in the same way as the leg-sweep apparatus 10 of the first embodiment.

Figure 9:
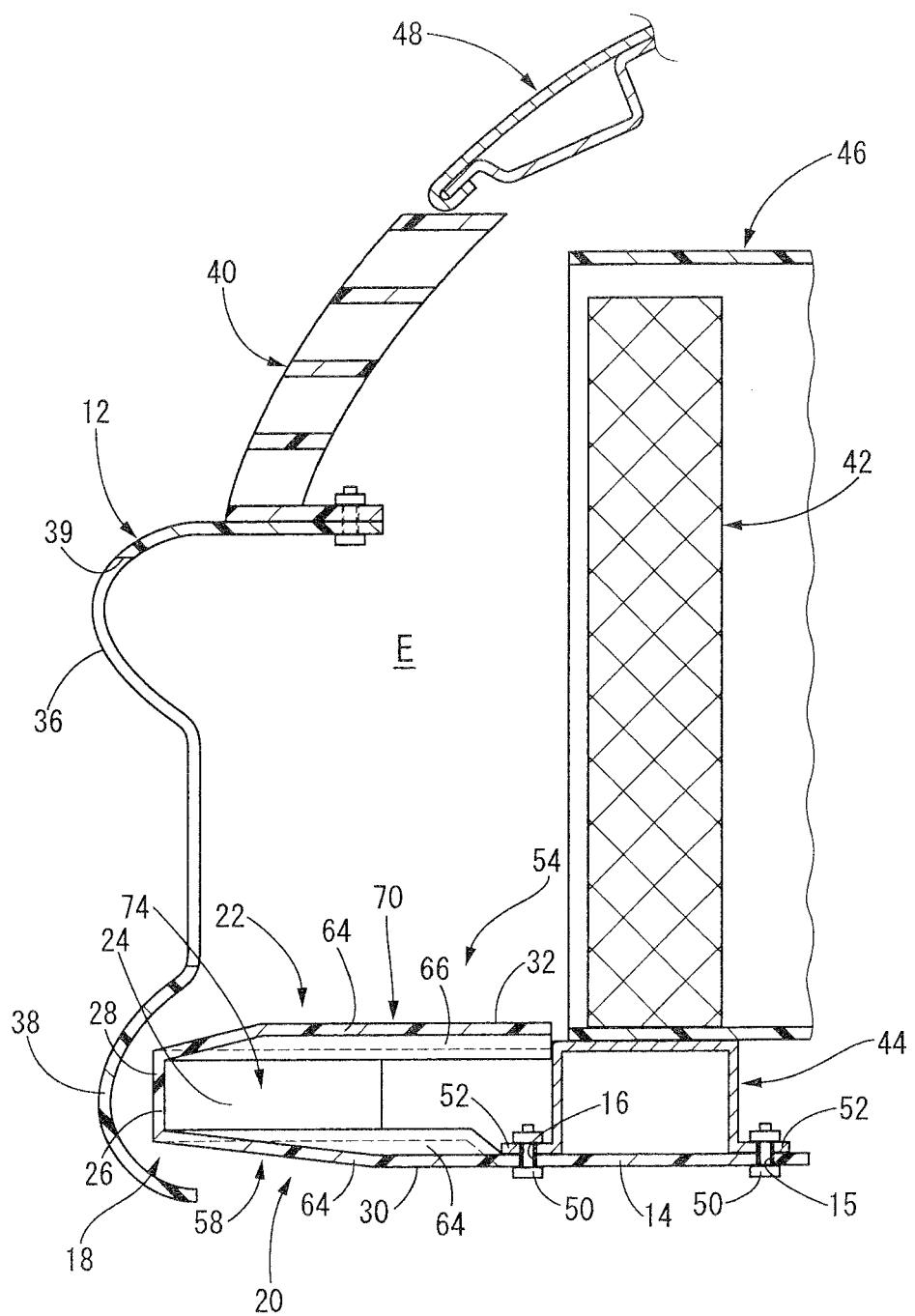
FIG. 9 is a vertical cross sectional view showing a state in which the pedestrian protection apparatus for a vehicle shown in FIG. 5 is installed on a vehicle, and corresponding to FIG. 4.

For example, as shown in FIG. 9, the leg-sweep apparatus 54 is positioned between the front bumper 12 and the radiator support 44 so as to extend in the front to back direction such that the front end portion of the reinforcing portion 18 is positioned in the lower protrusion 38 of the front bumper 12, and the rear end surface of the upper connecting plate 22 of the reinforcing portion 18 is opposed to the front face of the shroud 46 or the radiator 42 with a small distance therebetween. Then, at the attachment plate 14, the leg-sweep apparatus 54 is bolted at the flanges 52, 52 of the radiator support 44. Thus, the leg-sweep apparatus 54 is disposed between the lower protrusion of the front bumper 12 and the radiator support 44 at the lower region of the front of the automobile such that the plurality of first and second cylindrical structures 74, 76 are positioned so as to extend in the front to back direction, which is the input direction of the impact load.

Thus, like the leg-sweep apparatus 10 of the first embodiment, under installation of the leg-sweep apparatus 54 of this embodiment in the front of the automobile, the leg portion of the pedestrian who has contacted or collided with the front bumper 12 is swept or scooped up by the leg-sweep apparatus 54, thereby causing the pedestrian to fall down or to be thrown toward the hood 48 of the vehicle, for example. As a result, the protection and safety of the pedestrian can be effectively assured.

Especially, in the leg-sweep apparatus 54, in a state where the attachment plate 14 is fixed at the radiator support 44, the rear end of the rearwardly inclined plate 68 of the first reinforcing bead 56 provided in the lower connecting plate 20 of the first reinforcing bead 18 is positioned so as to abut with the front face of the flange 52 provided at the front side of the radiator support 44. Further, the rear end surface of the horizontal plate 60 of the second reinforcing bead 72 provided in the upper connecting plate 22 is positioned so as to abut with the front face of the radiator support 44. As apparent from this, in the present embodiment, the abutting portions are constituted by the rearwardly inclined plate 68 of the first reinforcing bead 56 and the rear end portion of the horizontal plate 60 of the second reinforcing bead 72.

Further, as described above, the portions connecting the upper ends of the vertical ribs 24 and connecting the lower ends of the vertical ribs 24 are constituted by the first reinforcing bead 70 and the second reinforcing bead 72 each having an angular U-shaped or trapezoidal cross section.

Thus, in the leg-sweep apparatus 54 of the present embodiment, the rigidity against the impact load inputted into the front to back direction is advantageously improved. Therefore, the leg portion of the pedestrian who has contacted or collided with the front bumper 12 can be surely swept, thereby more effectively protecting the pedestrian.

In the leg-sweep apparatus 54, the height $H_2$ of the first reinforcing bead 70 in the upper connecting plate 22 and the height $H_1$ of the second reinforcing bead 58 in the lower connecting plate 20 are sufficiently made smaller than the height of the conventional reinforcing bead, and the widths $W_2$, $W_1$ of the laterally inclined plates 66, 66 of the first and second reinforcing beads 70, 58 are made small to the maximum extent possible. Thus, the first reinforcing bead 70 and the second reinforcing bead 58 have the structure that does not deform easily upon input of the impact load into the reinforcing portion 18 compared with the conventional first and second reinforcing beads having large heights. Therefore, the rigidity of the reinforcing portion 18 is further effectively improved, thereby effectively protecting the pedestrian and securing the safety of the pedestrian.

In the leg-sweep apparatus 54 of the present embodiment, the upper air guiding surface 32 constituted by the upper surface of the upper connecting plate 22 extends horizontally over substantially the entire area from the back surface (inner surface) of the front bumper 12 to the front face of the radiator 42 at the lower region in the engine room E. In addition, the lower air guiding surface 30 constituted by the lower surface of the lower connecting plate 20 extends horizontally at the outside of the engine room E.

Thus, in the leg-sweep apparatus 54 of the present embodiment, like the leg-sweep apparatus 10 of the first embodiment, under installation of the leg-sweep apparatus 54 at the lower region of the front of the automobile, the aerodynamic drag at the lower region of the front of the automobile can be sufficiently reduced. Thus, the aerodynamic performance at the lower region of the automobile can be effectively improved, resulting in the improved fuel efficiency.

Although, in the present embodiment, the rearwardly inclined plate 68 extending in the horizontal direction is provided at the lower connecting plate 20, the airflow is not blocked since the rearwardly inclined plate 68 has sufficiently small area and inclines obliquely downward.

While the specific structure of the present invention has been described in detail above, for the illustrative purpose only, it is to be understood that the present invention is not limited to the foregoing description.

For example, the dimension of the vertical rib 24 measured in the front to back direction and the dimension of the upper connecting plate 22 measured in the front to back direction may be suitably changed.

Figure 10:
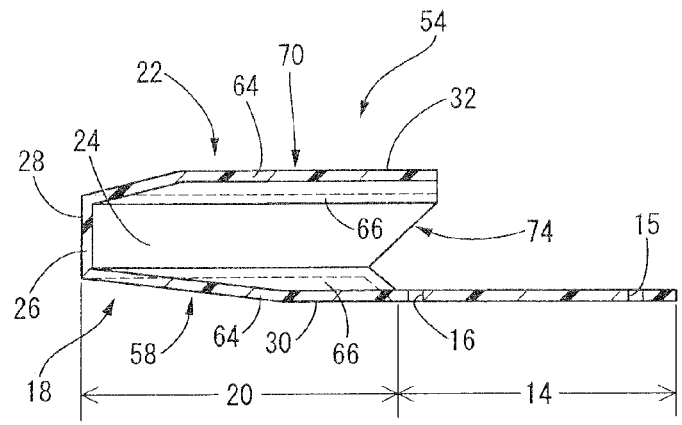
FIG. 10 is a view showing a third embodiment of a pedestrian protection apparatus for a vehicle having a structure according to the present invention, and corresponding to FIG. 3.

With reference to a third embodiment shown in FIG. 10, the dimension in the front to back direction of the vertical rib 24 may be substantially the same as that of the upper connecting plate 22. In such a case, the upper connecting plate 22 and the lower connecting plate 20 can be connected by the vertical rib 24 extending across the entire length of the plates in the front to back direction. This may effectively improve the rigidity of the reinforcing portion 18.

Figure 11:
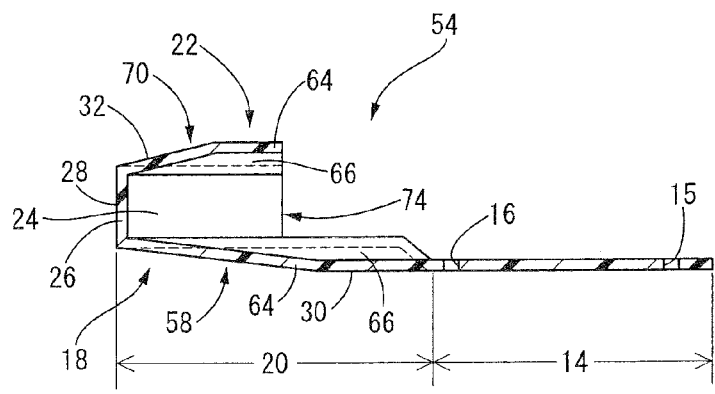
FIG. 11 is a view showing a fourth embodiment of a pedestrian protection apparatus for a vehicle having a structure according to the present invention, and corresponding to FIG. 3.

With reference to a fourth embodiment shown in FIG. 11, the dimension in the front to back direction of the vertical rib 24 may be smaller than that of the lower connecting plate 20, and the dimension in the front to back direction of the upper connecting plate 22 may be substantially the same as that of the vertical rib 24. In such a case, the rigidity of the reinforcing portion 18 can be sufficiently secured, and the material cost may be advantageously reduced.

Figure 12:
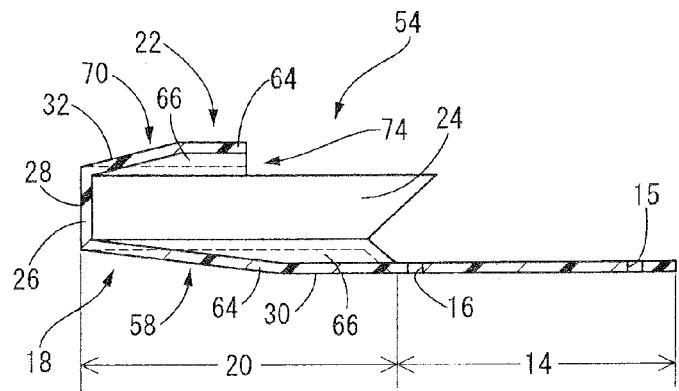
FIG. 12 is a view showing a fifth embodiment of a pedestrian protection apparatus for a vehicle having a structure according to the present invention, and corresponding to FIG. 3.
Figure 13:
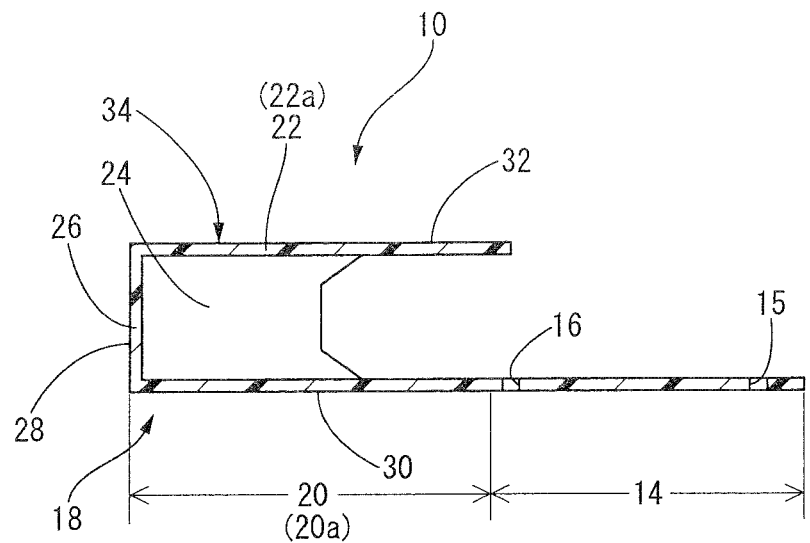
FIG. 13 is a view showing a sixth embodiment of a pedestrian protection apparatus for a vehicle having a structure according to the present invention, and corresponding to FIG. 3.
Figure 14:
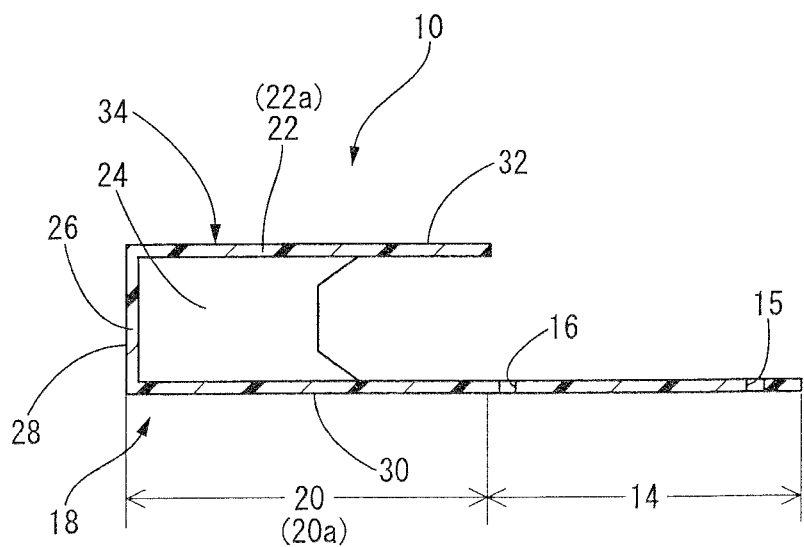
FIG. 14 is a view showing a seventh embodiment of a pedestrian protection apparatus for a vehicle having a structure according to the present invention, and corresponding to FIG. 3.
Figure 15:
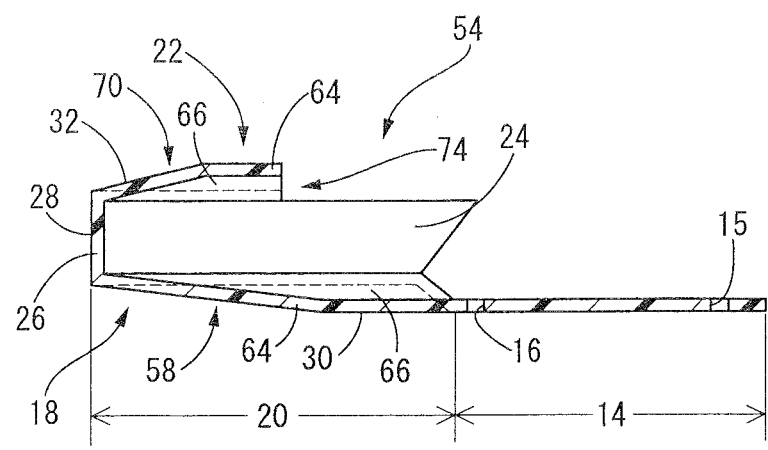
FIG. 15 is a view showing an eighth embodiment of a pedestrian protection apparatus for a vehicle having a structure according to the present invention, and corresponding to FIG. 3.
Figure 16:
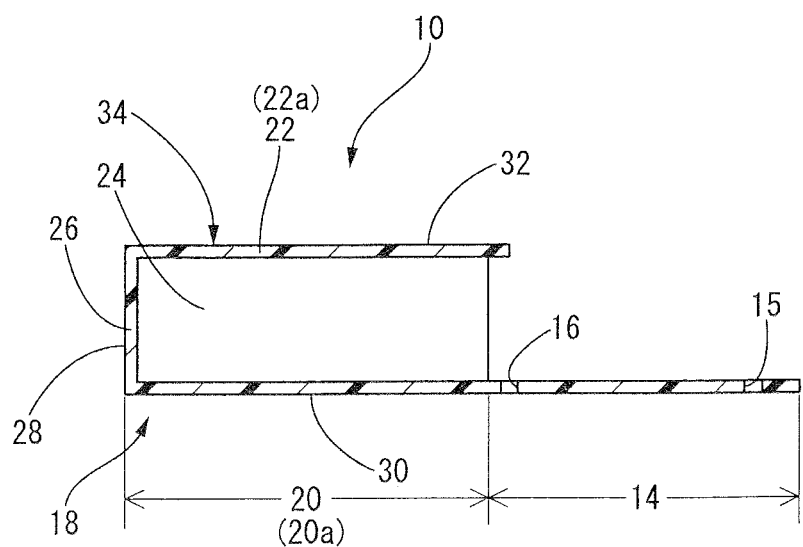
FIG. 16 is a view showing a ninth embodiment of a pedestrian protection apparatus for a vehicle having a structure according to the present invention, and corresponding to FIG. 3.

With reference to a fifth embodiment shown in FIG. 12, the dimension in the front to back direction of the vertical rib 24 may be larger than that of the upper connecting plate 22. In such a case, it is preferable that the vertical ribs 24 has such a dimension in the front to back direction as to contact with the front face of the radiator support 44 at the rear end of the vertical rib 24, under installation of the leg-sweep apparatus 10 at the lower region of the front of the vehicle. That is, unlike the first and second embodiments, instead of the rear end portion of the upper connecting plate 22, a rear end portion of the vertical rib 24 may be the abutting portion. This can advantageously reduce the formation material of the leg-sweep apparatus 10 compared with the case where the abutting portion is the rear end portion of the upper connecting plate 22 that is made to have a larger dimension in the front to back direction.

Although the dimension in the front to back direction of the upper air guiding surface 32 constituted by the upper surface of the upper connecting plate 22 is suitably determined depending on the dimension in the front to back direction of the upper connecting plate 22, it is preferable that the upper air guiding surface 32 extend from the front end of the vertical ribs 24 to a position substantially directly above the front through hole 16 of the attachment plate 14 (where the rear section is fixed to the vehicle component). Specifically, the dimension in the front to back direction of the upper air guiding surface 32 may be a little bit larger than the dimension from the front end of the vertical rib 24 to a position directly above the front through hole 16 of the attachment plate 14 (hereinafter, referred to as dimension A) as shown in FIG. 3, or may be the same as the dimension A as shown in a sixth embodiment in FIG. 13, or may be a little bit smaller than the dimension A as shown in a seventh embodiment in FIG. 14. Due to such dimension in the front to back direction of the upper air guiding surface 32, the air taken through the air inlet 39 of the front bumper 12 can be smoothly guided to the front face of the radiator 42.

Although the dimension in the front to back direction of the vertical rib 24 is also not particularly limited, it is preferable that the vertical rib 24 extend from the front end of the lower connecting plate 20 to a position near the front through hole 16 of the attachment plate 14. Specifically, the dimension in the front to back direction of the vertical rib 24 may be a little bit larger than the dimension from the front end of the lower connecting plate 20 to a position directly above the front through hole 16 of the attachment plate 14 (hereinafter, referred to as dimension B) as shown in FIG. 10, or may be the same as the dimension B as shown in an eighth embodiment in FIG. 15, or may be a little bit smaller than the dimension B as shown in a ninth embodiment in FIG. 16. Due to such dimension in the front to back direction of the vertical rib 24, the strength of the lower connecting plate 20, eventually, the rigidity of the reinforcing portion 18 can be advantageously improved.

The cylindrical structures 34, 74, 76 may have any shape that allow the cylindrical structures 34, 74, 76 to be arranged in a line in the horizontal direction and extended in the front to back direction at the front section of the leg-sweep apparatus 10, 54. For example, the cylindrical structures 34, 74, 76 having circular, elliptical, polygonal, or amorphous cross section may be suitably employed. Further, the number of the cylindrical structures 34, 74, 76 is not particularly limited as long as the number is plural.

Further, the rear end surface of the upper connecting plate 22 having a flat plate shape may be made as the abutting portion that abuts on the vehicle component such as the radiator support 44 to which the attachment plate 14 is fixed.

In the case where the abutting portion is provided at the reinforcing portion 18, under installation of the leg-sweep apparatus 10, 54 at the lower region of the front of the automobile, the abutting portion does not necessary to abut on the vehicle component such as the radiator support 44. As long as the abutting portion is arranged to abut on the vehicle component before the reinforcing portion 18 is deformed or the reinforcing portion 18 is displaced backward at the initial stage of the displacement of the reinforcing portion 18 by the impact load generated upon the collision of the pedestrian with the front bumper 12, a space may be provided between the abutting portion and the vehicle component.

In the leg-sweep apparatus 54 according to the second embodiment, the first cylindrical structures 74 each having an octagonal vertical cross section and the second cylindrical structures 76 each having a rectangular vertical cross section are alternately provided in the horizontal direction at the front section of the leg-sweep apparatus 54 to constitute the reinforcing portion 18. However, the first cylindrical structures 74 and the second cylindrical structures 76 may be suitably arranged in other orders to constitute the reinforcing portion 18.

Further, the leg-sweep apparatus 54 may have a structure in which only one of the upper connecting plate 22 and the lower connecting plate 20 is made of a corrugated plate including the first and second reinforcing beads 56, 58, 70, 72, as bending portions, each having an angular U-shaped cross section, and the other one of them is made of a flat plate including no first and second reinforcing beads 56, 58, 70, 72.

Two or more of the cylindrical structures 34, 74, 76 may be stacked in the vertical direction and two or more of the stacked cylindrical structures 34, 74, 76 may be arranged in a line in the vehicle width direction to form the reinforcing portion 18.

In addition to the pedestrian protection apparatus that is disposed inside the front bumper fixed to the front face of the vehicle, the present invention may be advantageously applied to any pedestrian protection apparatus. For example, the present invention may be applied to the pedestrian protection apparatus that is disposed in the position other than the inside of the front bumper, or may be applied to the pedestrian protection apparatus that is deposed at the lower region of the front of a vehicle other than the automobile.

Although further details will not be described herein, it is to be understood that the present invention may be embodied with various other changes and modifications which may occur to those skilled in the art, without departing from the spirit and scope of the invention.

The invention claimed is:

1. A pedestrian protection apparatus for a vehicle, comprising: a resin molded product which is configured to be disposed at a lower region of a front of the vehicle so as to extend in a front to back direction of the vehicle, the resin molded product including a front section at which a reinforcing portion is provided and a rear section comprising an attachment plate at which the apparatus is configured to be fixed to a vehicle component, the apparatus being arranged to protect a leg portion of a pedestrian that has collided with a front face of the vehicle by contact of a front end of the resin molded product with the leg portion of the pedestrian, wherein the reinforcing portion is constituted by a plurality of cylindrical structures that are arranged at the front section so as to be in a line in the vehicle width direction and extend in the front to back direction of the vehicle, the plurality of cylindrical structures comprising: (a) at least three vertical ribs that are arranged at the front section so as to be opposed to each other in the vehicle width direction with a predetermined distance therebetween and extend in the front to back direction of the vehicle; (b) an upper connecting plate that is arranged to extend in the front to hack direction of the vehicle while extending across upper ends of all of the at least three vertical ribs, thereby integrally connecting the upper ends of the at least three vertical ribs; (c) a lower connecting plate that is arranged to extend in the front to back direction of the vehicle while extending across lower ends of all of the at least three vertical ribs, thereby integrally connecting the lower ends of the at least three vertical ribs, and (d) a front wall integrally and vertically provided at a front end of an upper surface of the lower connecting plate and extending over an entire width of the lower connecting plate, thereby closing a front of each of the plurality of cylindrical structures;

wherein the lower connecting plate and the attachment plate are made of a single plate member; and wherein the upper connecting plate has a dimension in the front to back direction that is the same as, or larger than, a longest dimension of the vertical ribs in the front to back direction, so that spaces between the upper ends of adjacent vertical ribs and the lower ends of the adjacent vertical ribs are respectively closed by the upper connecting plate and the lower connecting plate.

2. The apparatus according to claim 1, wherein each of the plurality of cylindrical structures has a rectangular vertical cross section.

3. The apparatus according to claim 1, wherein the at least three vertical ribs are arranged over an entire width of the front section at a regular interval.

4. The apparatus according to claim 1, wherein each of at least some of the plurality of cylindrical structures has a rectangular vertical cross section and each of the remaining cylindrical structures has an octagonal vertical cross section, the plurality of cylindrical structures that have a rectangular vertical cross section and the plurality of cylindrical structures that have an octagonal vertical cross section being alternately arranged.

5. The apparatus according to claim 1, wherein an upper surface of the upper connecting plate is made as an air guiding surface that guides airflow to a rear side of the vehicle, the air guiding surface extending in the front to back direction of the vehicle from a front end of each of the at least three vertical ribs to a position substantially directly above a position where the rear section is fixed to the vehicle component.

6. The apparatus according to claim 1, wherein the at least three vertical ribs extend in the front to back direction of the vehicle from the front end of the lower connecting plate to a position near the position where the rear section is fixed to the vehicle component.

7. The apparatus according to claim 1, wherein at least one part of the upper connecting plate is made as a bending portion having an angular U-shaped cross section, the at least one part of the upper connecting plate being positioned between the upper ends of opposing two of the at least three vertical ribs.

8. The apparatus according to claim 1, wherein at least one part of the lower connecting plate is each made as a bending portion having an angular U-shaped cross section, the at least one part of the lower connecting plate being positioned between the lower ends of opposing two of the at least three vertical ribs.

9. The apparatus according to claim 1, wherein at least one part of the upper connecting plate and at least one part of the lower connecting plate are each made as a bending portion having an angular U-shaped cross section, the at least one part of the upper connecting plate being positioned between the upper ends of opposing two of the at least three vertical ribs and at least one part of the lower connecting plate being positioned between the lower ends of opposing two of the at least three vertical ribs.

10. The apparatus according to claim 1, wherein at least one of the upper connecting plate and the lower connecting plate includes an abutting portion that is positioned in front of the vehicle component in a state where the rear section of the resin molded product is fixed to the vehicle component, the abutting portion allowed to be in contact with the vehicle component at the time when the at least one of the upper connecting plate and the lower connecting plate having the abutting portion is displaced to the rear side upon collision of the pedestrian with the front section.

11. The apparatus according to claim 1, wherein all of the at least three vertical ribs are planar and extend only in the front to back direction of the vehicle.

\* \* \* \* \*